(12) United States Patent
Hinchey (10) Patent No.: US 7,673,089 B2
(45) Date of Patent: Mar. 2, 2010

(54) FLASH DRIVE MEMORY APPARATUS AND METHOD

(75) Inventor: Michael G. Hinchey, Bowie, MD (US)

(73) Assignee: The United States of America as represented by the Administrator of the National Aeronautics and Space Administration, Washington, DC (US)

(*) Notice: Subject to any disclaimer, the term of this patent is extended or adjusted under 35 U.S.C. 154(b) by 0 days.

(21) Appl. No.: 11/935,572

(22) Filed: Nov. 6, 2007

(65) Prior Publication Data

US 2008/0104291 A1 May 1, 2008

Related U.S. Application Data (63) Continuation of application No. 11/536,895, filed on Sep. 29, 2006, now abandoned.

(51) Int. Cl.
*G06F 15/167* (2006.01)

(52) U.S. Cl. .................. 710/300; 710/308; 709/212; 709/216

(58) Field of Classification Search ......... 711/147–153; 710/300, 308; 709/212, 216
See application file for complete search history.

(56) References Cited

U.S. PATENT DOCUMENTS

| | | | | |
|---|---|---|---|---|
| 5,581,709 A * | 12/1996 | Ito et al. ........................ 710/38 |
| 6,233,659 B1 * | 5/2001 | Cohen et al. ................. 711/153 |
| 6,385,677 B1 * | 5/2002 | Yao ............................. 711/115 |
| 6,445,394 B1 * | 9/2002 | Chow et al. .................. 345/532 |
| 6,546,450 B1 * | 4/2003 | Liu .............................. 710/316 |
| 6,561,421 B1 * | 5/2003 | Yu ............................... 235/451 |
| 6,622,195 B2 * | 9/2003 | Osakada et al. ............. 710/316 |
| 6,792,501 B2 * | 9/2004 | Chen et al. ................... 711/103 |
| 6,813,668 B2 * | 11/2004 | Tseng et al. ................. 710/301 |
| 6,832,281 B2 * | 12/2004 | Jones et al. .................. 710/301 |
| 6,890,188 B1 * | 5/2005 | Le ............................... 439/76.1 |
| 6,908,038 B1 * | 6/2005 | Le ............................... 235/492 |
| 7,359,959 B2 * | 4/2008 | Lizzi et al. ................... 709/221 |
| 7,481,659 B2 * | 1/2009 | Johnson et al. ............. 439/131 |
| 2003/0093606 A1 * | 5/2003 | Mambakkam et al. ...... 710/305 |
| 2003/0100203 A1 * | 5/2003 | Yen .............................. 439/79 |
| 2003/0212841 A1 * | 11/2003 | Lin .............................. 710/62 |
| 2003/0221027 A1 * | 11/2003 | Chang et al. ................. 710/22 |
| 2004/0148450 A1 * | 7/2004 | Chen et al. ................... 710/313 |
| 2004/0252560 A1 * | 12/2004 | Hsieh ........................... 365/199 |
| 2005/0060490 A1 * | 3/2005 | Lu .............................. 711/115 |
| 2005/0066067 A1 * | 3/2005 | Suh .............................. 710/1 |
| 2005/0086413 A1 * | 4/2005 | Lee et al. ..................... 710/313 |
| 2005/0223145 A1 * | 10/2005 | Lin et al. ..................... 710/62 |
| 2005/0246494 A1 * | 11/2005 | Leon et al. ................... 711/115 |
| 2007/0022258 A1 * | 1/2007 | Panabaker et al. .......... 711/149 |
| 2008/0065837 A1 * | 3/2008 | Toyonaga et al. ........... 711/148 |

OTHER PUBLICATIONS

Web Site. http://gizmodo.com/gadgets/memory-infinite/, earliest date Nov. 21, 2007.

* cited by examiner

*Primary Examiner*—Paul R Myers
(74) *Attorney, Agent, or Firm*—Heather Goo (57) ABSTRACT

A memory apparatus includes a non-volatile computer memory, a USB mass storage controller connected to the non-volatile computer memory, the USB mass storage controller including a daisy chain component, a male USB interface connected to the USB mass storage controller, and at least one other interface for a memory device, other than a USB interface, the at least one other interface being connected to the USB mass storage controller.

10 Claims, 12 Drawing Sheets

FLASH DRIVE MEMORY APPARATUS AND METHOD

CROSS-REFERENCE TO RELATED APPLICATIONS

This application is a continuation-in-part of non-provisional patent application Ser. No. 11/536,895, filed Sep. 29, 2006, which is expressly incorporated by reference herein.

ORIGIN OF THE INVENTION

This invention was made by an employee of the United States Government and may be manufactured and used by or for the Government for governmental purposes without the payment of any royalties thereon or therefore.

FIELD OF THE INVENTION

The invention relates, in general, to digital storage devices, and in particular, to flash drives.

BACKGROUND

Conventional universal serial bus (USB) flash drives are NAND-type flash memory data storage devices integrated with a USB interface. Conventional USB flash drives are typically small, lightweight, removable and rewritable. These USB flash drives are commonly known as "thumb drives" and "data sticks."

USB flash drives have several advantages over other portable storage devices, particularly the floppy disk. Conventional USB flash drives are generally faster, hold more data, and are considered more reliable (due to their lack of moving parts) than floppy disks. Conventional USB flash drives use the USB mass storage standard, supported natively by modern operating systems such as Linux, Mac OS X, and Windows XP.

Conventional USB flash drives include a small printed circuit board encased in a robust plastic or metal casing, making the drive sturdy enough to be carried about in a pocket, as a key fob, or on a lanyard. Only a USB interface protrudes from this protection, and is usually covered by a removable cap. Most conventional USB flash drives use a standard type-A USB connection allowing them to be connected directly to a port on a personal computer. USB interfaces are also known as USB connectors.

Most conventional USB flash drives are active only when powered by a USB computer connection, and require no other external power source or battery power source; conventional USB flash drives are powered using the limited supply afforded by the USB connection. To access the data stored in a flash drive, the conventional USB flash drives must be connected to a computer, either by direct connection to the computer's USB port or via a USB hub. USB drives are quickly replacing CD ROMs, floppy drives, and even printed matter in usage.

One end of conventional USB flash drives is fitted with a single male type-A USB interface. Inside the plastic casing is a small printed circuit board. Mounted on this board are simple power circuitry and a small number of surface-mounted integrated circuits (ICs). Typically, one of these ICs provides an interface to the USB port, another drives the onboard memory, and yet another is the flash memory.

The essential components of conventional USB flash drives are a male type-A USB interface, a USB mass storage controller, a NAND flash memory chip and a crystal oscillator. The male type-A USB interface provides an interface to the host computer. The USB mass storage controller includes a USB host controller and provides a linear interface to block-oriented serial flash devices while hiding the complexities of block-orientation, block erasure, and wear balancing or wear leveling. The USB mass storage controller contains a small RISC microprocessor and a small amount of on-chip ROM and RAM. The NAND flash memory chip stores data. The crystal oscillator produces a 12 MHz clock signal and controls data output through a phase-locked loop.

Often the amount of data storage capacity that is available to a personal computer on a USB flash drive is less than the amount of data storage capacity on the USB flash drive that is useful to the computer. By definition, USB flash drives are limited in the amount of data that can be stored thereon because the NAND flash memory chip is manufactured with a certain amount of data storage capacity. The data storage capacity can be increased by physically replacing the NAND flash memory chip, but physically replacing the NAND flash memory chip costs many more times the price of the original USB flash drive, and accordingly, replacing the NAND flash memory chip is not performed except under the most extraordinary of circumstances.

Another option to increase the amount of data storage capacity that is available to a personal computer on a USB flash drive is to connect multiple USB flash drives to multiple USB ports on the computer. However, the number of USB ports that is available on a computer is usually limited to 2 or 3 USB ports, so the number of USB flash drives that can be connected is 2 or 3. Each of the USB flash drives is identified and accessible to the computer as a unique external drive, each having a unique drive identification, such as "D", "E", "F" and so forth. However, each of the USB flash drives having a unique and different drive identification increases the complexity of locating data on the USB flash drives.

Another conventional way to increase the amount of data storage capacity that is available to a personal computer on a USB flash drive is to connect multiple USB flash drives through one of more USB hubs that are in turn connected to the computer. However, this technique still has the problem that each drive has a unique and different drive identification, which in turn increases the complexity of locating data on the USB flash drives. This technique is also ultimately limited by the number of USB ports on the computer and the number of USB devices that can be connected to each port.

There is a need in the art to increase the storage capacity that is available to a personal computer on a USB flash drive. There is also a need in the art to reduce the complexity of locating data on multiple USB flash drives connected to a computer.

SUMMARY

In one aspect, a memory apparatus includes a non-volatile computer memory, a USB mass storage controller connected to the non-volatile computer memory, a male USB interface connected to the USB mass storage controller, and at least one other interface for a memory device, other than a USB interface. The USB mass storage controller includes a daisy chain component. The at least one other interface is connected to the USB mass storage controller.

The apparatus can further include at least one female USB interface connected to the USB mass storage controller.

The at least one other interface can include a plurality of interfaces, other than USB interfaces, for memory devices.

The apparatus can further include a memory device inserted in the at least one other interface.

In another aspect, a method of combining memory apparatus includes providing a computer having at least one USB port, providing a first memory apparatus having a non-volatile computer memory, a USB mass storage controller connected to the non-volatile computer memory, a male USB interface connected to the USB mass storage controller, and at least one other interface for a memory device, other than a USB interface, inserting the male USB interface of the first memory apparatus into the USB port of the computer, providing a second memory apparatus having a non-volatile computer memory and an interface, other than a USB interface, and inserting the interface of the second memory apparatus into the at least one other interface of the first memory apparatus. The USB mass storage controller includes a daisy chain component. The at least one other interface is connected to the USB mass storage controller, The method can further include using the computer to access the non-volatile computer memory of the first memory apparatus combined with the non-volatile computer memory of the second memory apparatus as a single computer memory.

In a further aspect, a memory apparatus includes a non-volatile computer memory, a first USB mass storage controller connected to the non-volatile computer memory, a first male USB interface connected to the first USB mass storage controller, a second USB mass storage controller connected to the non-volatile computer memory and the first USB mass storage controller, and a second male USB interface connected to the second USB mass controller.

At least one of the first and second male USB interfaces can be connected to the apparatus with an elongated cable.

The first USB mass storage controller can include a daisy chain component and the apparatus can further include at least one female USB interface connected to the first USB mass storage controller.

In yet another aspect, a method of sharing memory apparatus includes providing at least two computers each having at least one USB port, providing a memory apparatus having a non-volatile computer memory, a first USB mass storage controller connected to the non-volatile computer memory, a first male USB interface connected to the first USB mass storage controller, a second USB mass storage controller connected to the non-volatile computer memory and the first USB mass storage controller, and a second male USB interface connected to the second USB mass controller, inserting the first male USB interface of the memory apparatus into the USB port of one of the computers, and inserting the second male USB interface of the memory apparatus into the USB port of another one of the computers.

The method can further include accessing the non-volatile computer memory of the memory apparatus using the one computer.

Further features and advantages of the invention will become apparent from the following detailed description taken in conjunction with the following drawings.

DETAILED DESCRIPTION

Figure 1:
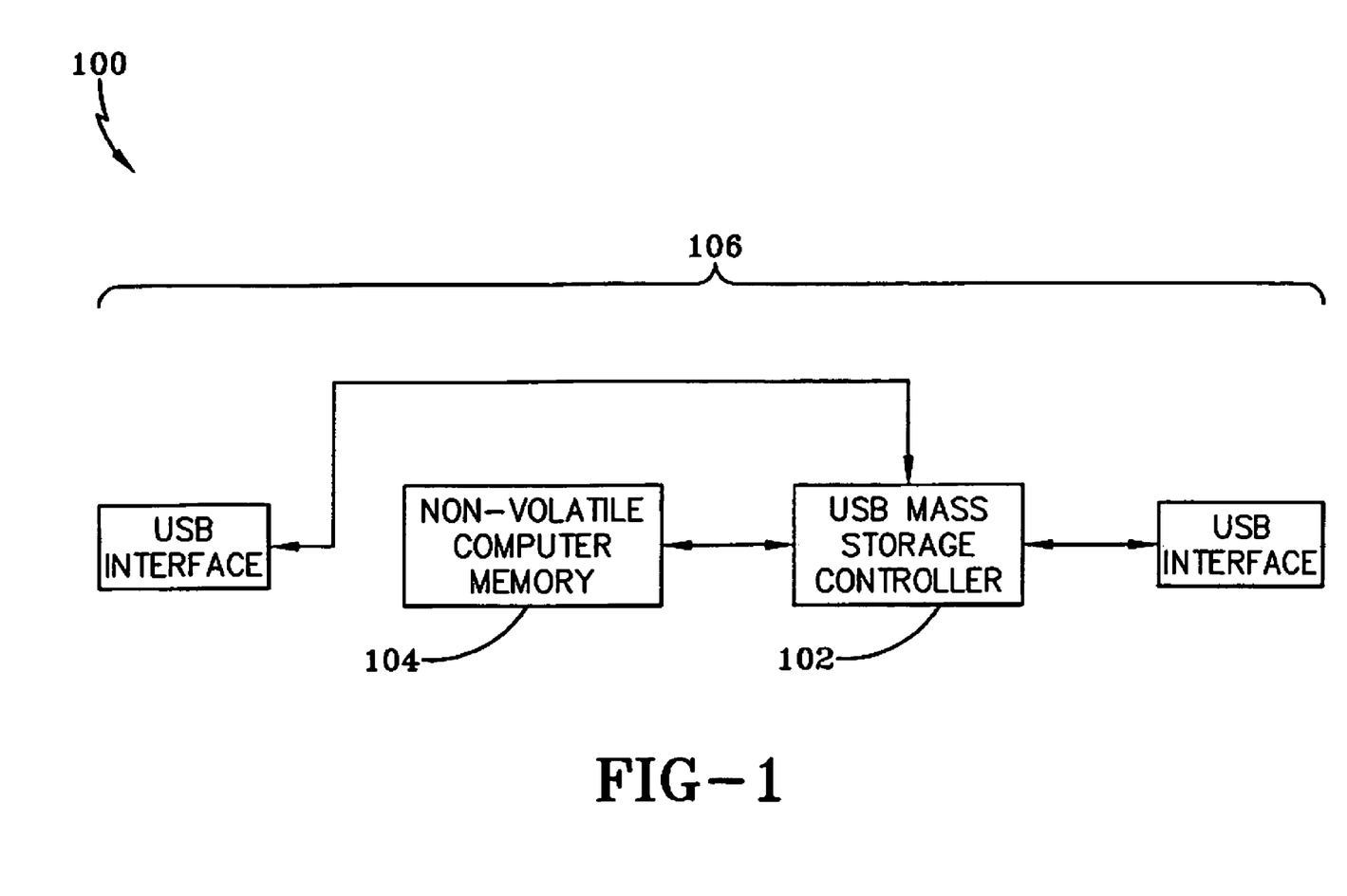
FIG. 1 is a block diagram of an overview of a system to store data using a plurality of USB interfaces, according to an embodiment.

FIG. 1 is a block diagram of an overview of a system 100 to store data having plurality of USB interfaces, according to an embodiment. A system level overview of the operation of an embodiment is described in this section of the detailed description. System 100 may solve the need in the art to increase the storage capacity that is available to a personal computer on a universal serial bus (USB) drive.

System 100 may include a USB mass storage controller 102 and a non-volatile computer memory 104. Some embodiments of system 100 include a plurality of USB interfaces 106. The USB mass storage controller 102 can be operably coupled to the non-volatile computer memory 104 and the plurality of USB interfaces 106, as indicated.

The plurality of USB interfaces 106 can provide a way to couple multiple USB drives to a computer (not shown in FIG. 1). In some embodiments, system 100 can be coupled to a computer through one of the plurality of USB interfaces 106, while another storage device (not shown in FIG. 1) can be coupled to system 100 through one of the other USB interfaces 106. Operably coupling the non-volatile computer memory 104 to the computer through one of the plurality of USB interfaces 106 and operably coupling the other storage device through the one of the plurality of USB interfaces 106 can provide access by the computer to the non-volatile computer memory 104 and, in some embodiments, can provide access by the computer to the other storage device. Thus, system 100 may solve the need in the art to increase the storage capacity that is available to a personal computer on a USB drive, such as system 100.

While the system 100 is not limited to any particular USB mass storage controller 102, non-volatile computer memory 104, and plurality of USB interfaces 106, for sake of clarity a simplified USB mass storage controller 102, non-volatile computer memory 104, and plurality of USB interfaces 106 are described. Some embodiments can operate in a multi-processing, multi-threaded operating environment on a computer, such as computer 802 in FIG. 8.

Referring to FIGS. 2-7, particular implementations are described in conjunction with the system overview in FIG. 1, according to embodiments.

Figure 2:
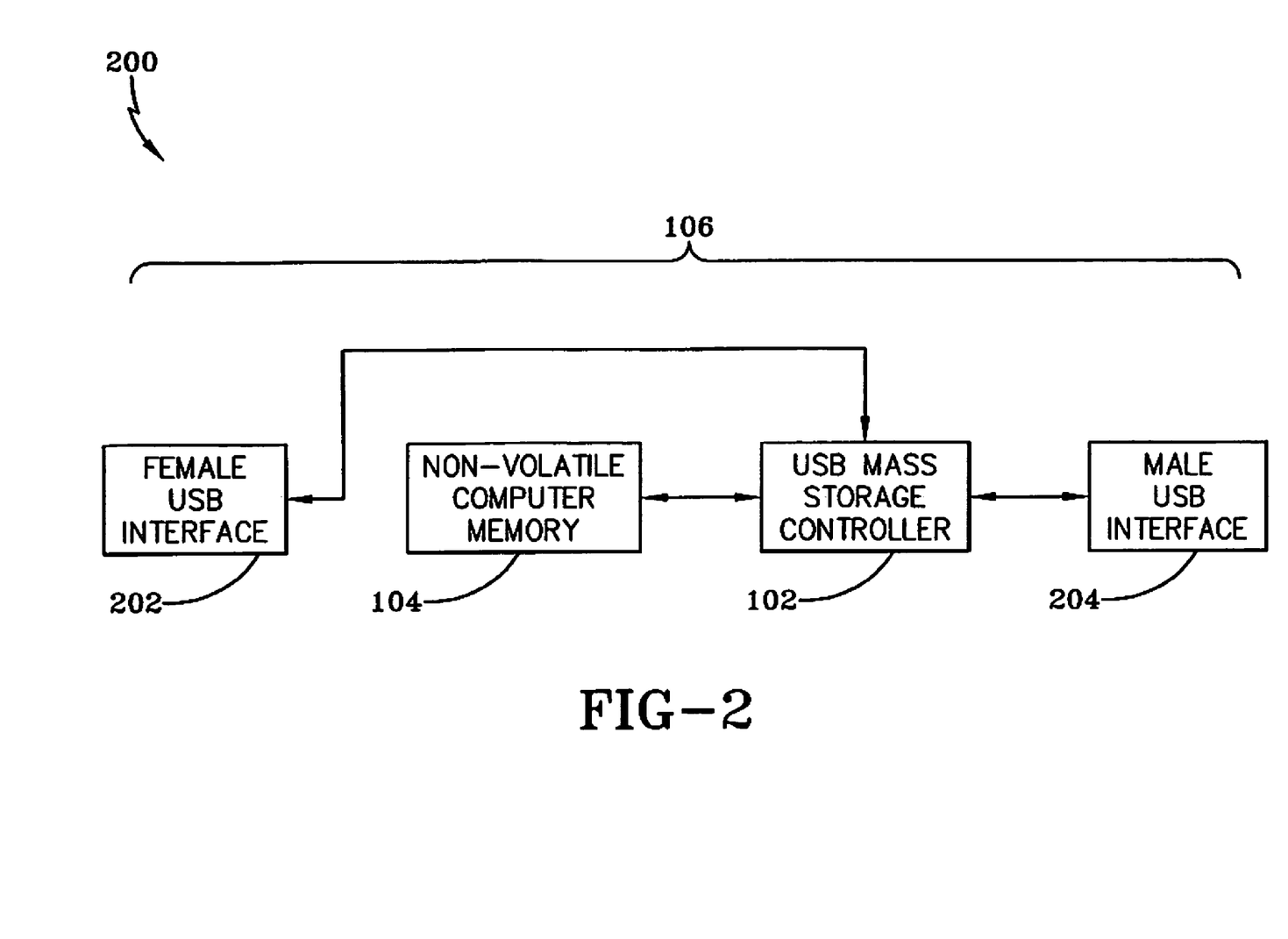
FIG. 2 is a block diagram of an apparatus to store data having a non-volatile computer memory, a male interface and a female interface, according to an embodiment.

FIG. 2 is a block diagram of an apparatus 200 for storing data, and is illustrated as having a non-volatile computer memory, a male interface and a female interface, according to an embodiment. Apparatus 200 may solve the need in the art to increase the storage capacity that is available to a personal computer on a universal serial bus (USB) drive.

Embodiments of apparatus 200 may include a USB mass storage controller 102, a non-volatile computer memory 104, and a plurality of USB interfaces 106. In some embodiments of apparatus 200, the plurality of USB interfaces 106 can include a female USB interface 202 to accept an external device. The female USB interface 202 may be operably coupled to the non-volatile computer memory 104 through the USB mass storage controller 102.

Apparatus 200 may also include a male USB interface 204 to connect to an external device, such as a computer. The male USB interface 204 may also be operably coupled to the non-volatile computer memory 104 through the USB mass storage controller 102.

The female USB interface 202 and the male USB interface 204 to external devices can provide a way to simultaneously couple multiple USB drives to a computer (not shown in FIG. 2). In one example, apparatus 200 may be coupled to the computer through the male USB interface 204 and apparatus 200 may be simultaneously coupled to another storage device (not shown in FIG. 2) through the female USB interface 202. Operably coupling the non-volatile computer memory 104 to the computer through male USB interface 204 and operably coupling the other storage device through the female USB interface 202 can provide access by the computer to the non-volatile computer memory 104 and, in some embodiments, may provide access by the computer to the other storage device. Thus, apparatus 200 may solve the need in the art to increase the storage capacity that is available to a personal computer.

FIG. 2 shows one female USB interface 202. Those skilled in the art will recognize that other embodiments of apparatus 200 are not so limited, and in fact can include a large number of female USB interfaces 202 that are not shown in FIG. 2.

Figure 3:
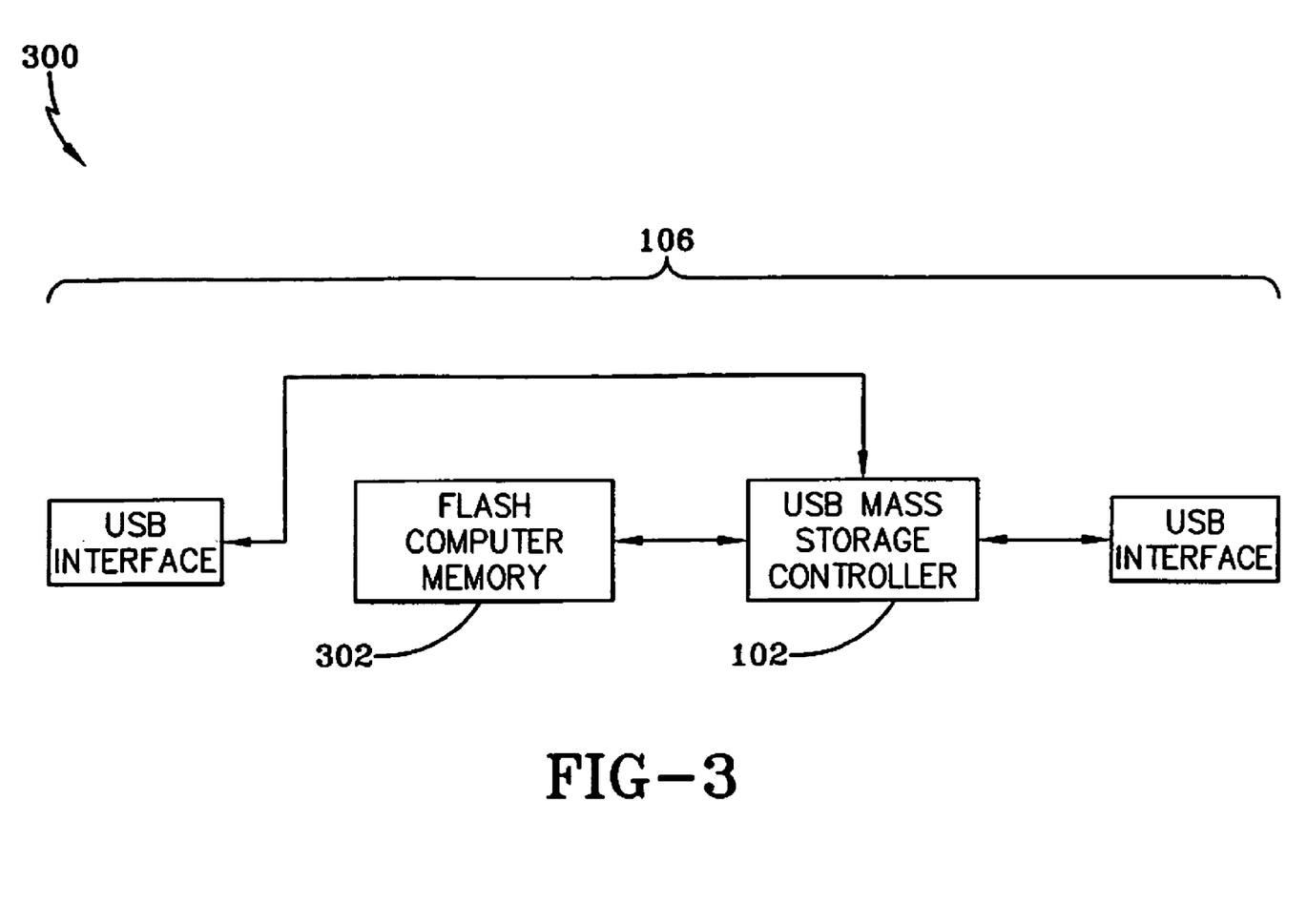
FIG. 3 is a block diagram of an overview of an apparatus to store data that includes flash memory and a plurality of USB interfaces, according to an embodiment.

FIG. 3 is a block diagram of an overview of an apparatus 300 to store data that includes flash memory and a plurality of USB interfaces, according to an embodiment. Apparatus 300 may solve the need in the art to increase the storage capacity that is available to a personal computer on a USB drive.

In some embodiments, apparatus 300 may include a USB mass storage controller 102 and a flash computer memory 302. The flash computer memory 302 may be one embodiment of the non-volatile computer memory 104 in FIG. 1. Most significantly, some embodiments of apparatus 300 include a plurality of USB interfaces 106. The USB mass storage controller 102 can be operably coupled to the flash computer memory 302 and the plurality of USB interfaces 106, as shown.

The plurality of USB interfaces 106 may provide a way to couple multiple USB drives to a computer (not shown in FIG. 3) or other external device. In one example, apparatus 300 may be coupled through one of the plurality of USB interfaces 106 to another storage device (not shown in FIG. 3), while another external device may be coupled to apparatus 300 through one of the other USB interfaces 106. Operably coupling the flash computer memory 302 to the computer or external device through one of the plurality of USB interfaces 106 and operably coupling the other storage device through the one of the plurality of USB interfaces 106 can provide access by the computer or external device to the flash computer memory 302 and, perhaps most significantly, in some embodiments can provide access by the computer to the other storage device. Thus, apparatus 300 may solve the need in the art to increase the storage capacity that is available to a personal computer on a USB drive, such as apparatus 300.

Figure 4:
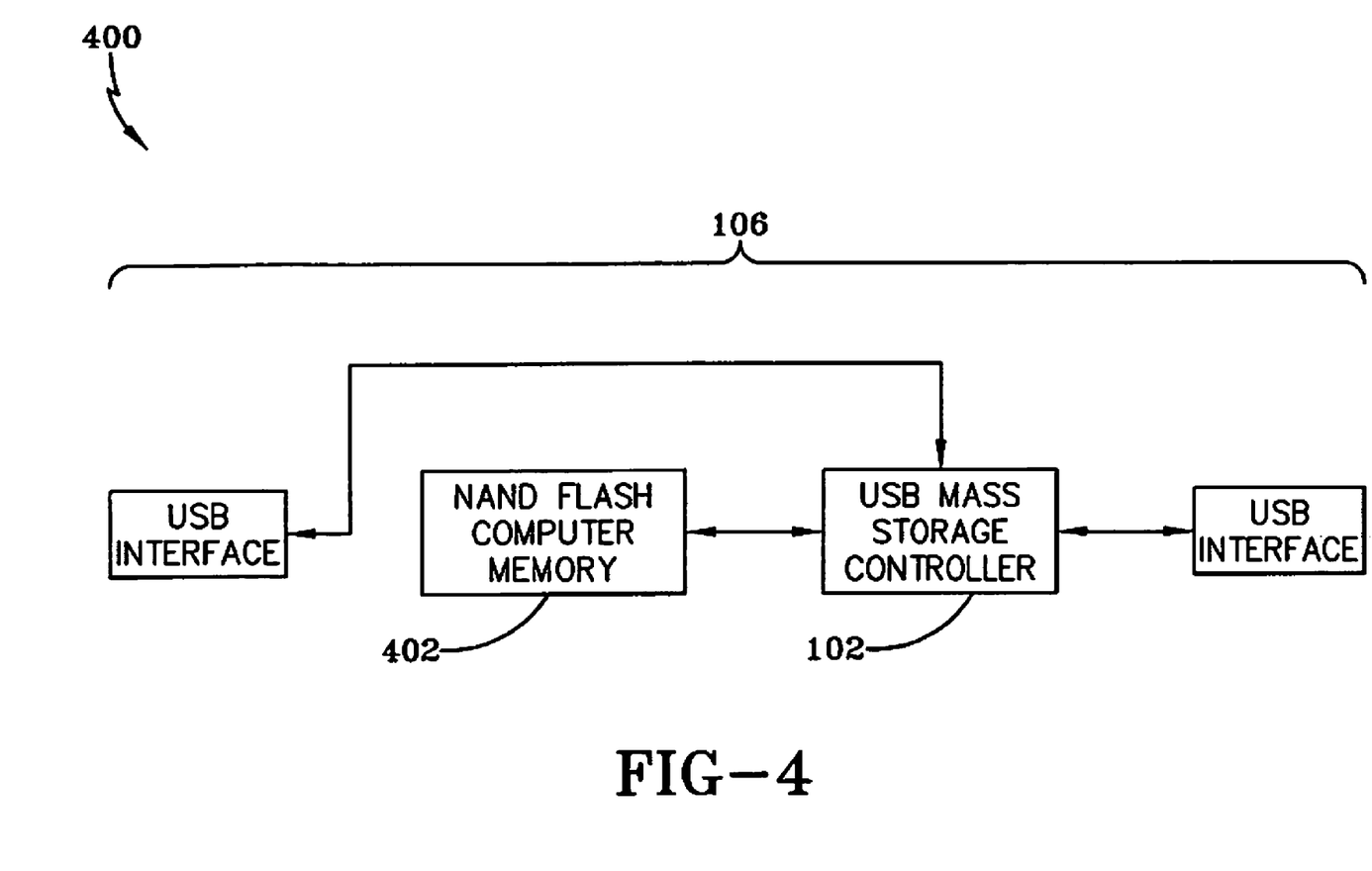
FIG. 4 is a block diagram of an overview of an apparatus to store data that includes NAND flash memory and a plurality of USB interfaces, according to an embodiment.

FIG. 4 is a block diagram of an overview of an apparatus 400 to store data that includes NAND flash memory and a plurality of USB interfaces, according to an embodiment. Apparatus 400 may solve the need in the art to increase the storage capacity that is available to a personal computer on a USB drive.

Apparatus 400 may include a USB mass storage controller 102 and a NAND flash computer memory 402. The NAND flash computer memory 402 may be one embodiment of the non-volatile computer memory 102 in FIG. 1 and also may be one embodiment of the flash computer memory 302 in FIG. 3. Some embodiments of apparatus 400 may include a plurality of USB interfaces 106. The USB mass storage controller 102 can be operably coupled to the NAND flash computer memory 402 and the plurality of USB interfaces 106.

According to some embodiments, the NAND flash computer memory 402 can be accessed much like block devices such as hard disks or memory cards. The blocks can typically be 512 or 2048 bytes in size, although those skilled in the art will understand that any number of sizes fall within the purview of this invention. In some embodiments, each block may be associated with a few bytes (typically 12-16 bytes) that could be used for storage of an error detection and correction block checksum.

In some embodiments, the NAND flash computer memory 402 can be accessed through software-based bad block management that may be resident on the USB mass storage controller 102. When a logical block on the NAND flash computer memory 402 is accessed, the logical block may be mapped to a physical block, and the apparatus 400 may have a number of blocks set aside on the NAND flash computer memory 402 for compensating bad blocks and for storing primary and secondary mapping tables.

In some embodiments, the error-correcting and detecting checksum can typically correct an error where one bit in the block may be incorrect. When this happens, the block can be marked bad in a logical block allocation table, and its (still undamaged) contents can be copied to a new block and the logical block allocation table can be altered accordingly. If more than one bit in the memory is corrupted, the contents may be partly lost; reconstructing the original contents may be nearly impossible.

According to some embodiments, the first error-free physical block (block 0) may almost always be readable and free from errors. Hence, all vital pointers for partitioning and bad block management for the device can be located inside this block (typically a pointer to bad block tables, for example).

In some embodiments, when executing software from the NAND flash computer memory 402, virtual memory strategies can be used. For example, memory contents of the NAND flash computer memory 402 can first be paged or copied into memory-mapped RAM and executed there. Some embodiments of apparatus 400 may also include a memory management unit (MMU), such as may be resident on the USB mass storage controller 102, but other embodiments of apparatus can also be accomplished with careful programming of the NAND flash computer memory 402, as will be known to those skilled in the art. For this reason, some embodiments of apparatus 400 may include a combination of NOR flash computer memory (not shown in FIG. 4) and NAND flash computer memory 402, where a smaller NOR flash computer memory can be used as software ROM and a larger NAND flash computer memory 402 can be partitioned with a file system for use as a RAM storage area.

The plurality of USB interfaces 106 may provide a way to couple multiple USB drives to a computer (not shown in FIG. 4). In at least one example, apparatus 400 can be coupled through one of the plurality of USB interfaces 106, and apparatus 400 can also be coupled to another storage device (not shown in FIG. 4) through one of the other USB interfaces 106. Operably coupling the NAND flash computer memory 402 to the computer through one of the plurality of USB interfaces 106 and operably coupling the other storage device through the one of the plurality of USB interfaces 106 can provide access by the computer to the NAND flash computer memory 402 and, perhaps most significantly, in some embodiments, may provide access by the computer to the other storage device. Thus, apparatus 400 may solve the need in the art to increase the storage capacity that is available to a personal computer on a USB drive, such as apparatus 400.

Figure 5:
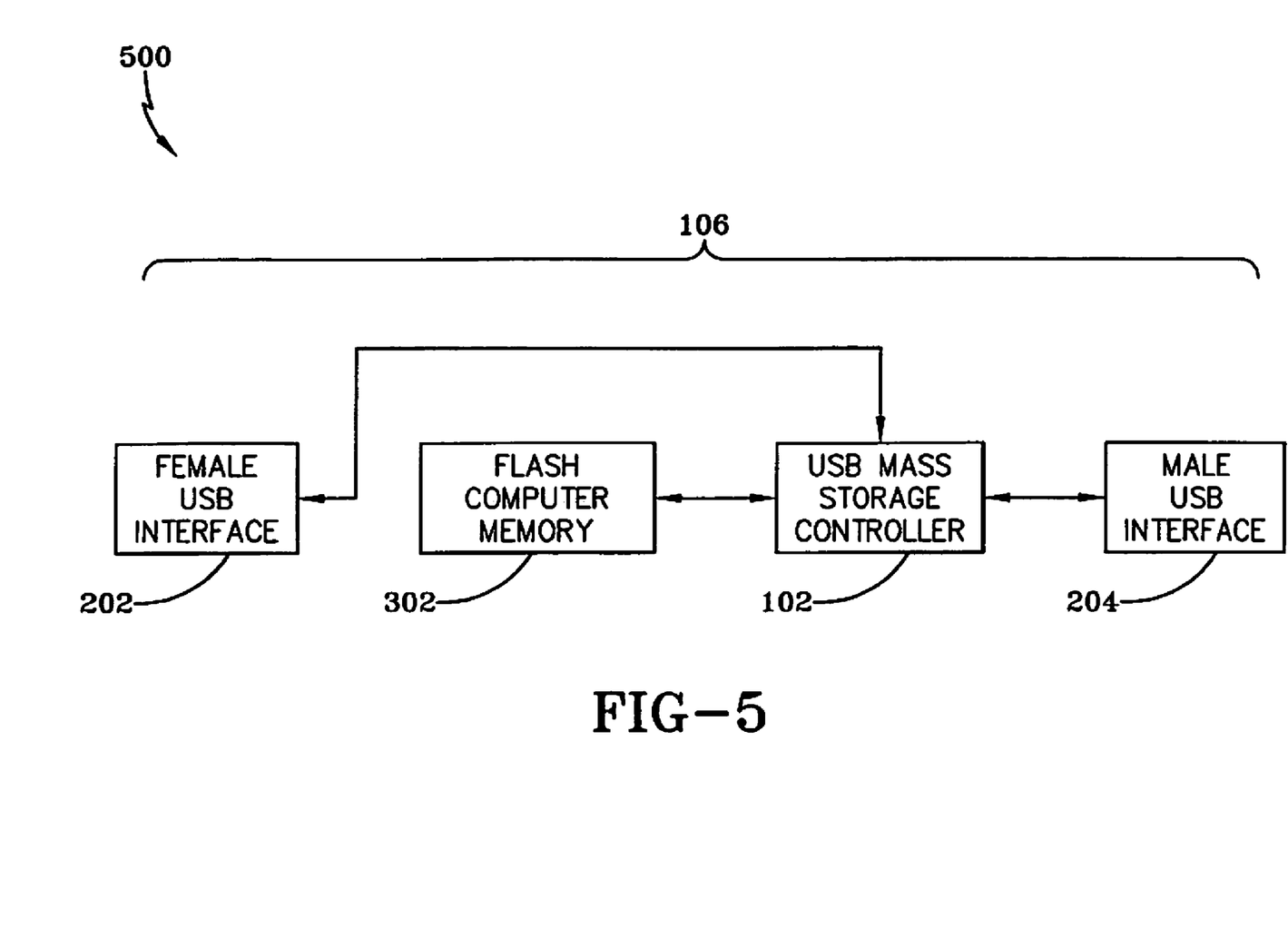
FIG. 5 is a block diagram of an apparatus to store data having a non-volatile computer memory, a male interface and a female interface, according to an embodiment.

FIG. 5 is a block diagram of an apparatus 500 to store data having a non-volatile computer memory, a male interface and a female interface, according to an embodiment. Apparatus 500 may solve the need in the art to increase the storage capacity that is available to a personal computer on a USB drive.

Apparatus 500 may include a USB mass storage controller 102 and a flash computer memory 302. The flash computer memory 302 can be one embodiment of the non-volatile computer memory 102 in FIG. 1. In apparatus 500, the plurality of USB interfaces 106 may include a female USB interface 202 to an external device. The female USB interface 202 may be operably coupled to the flash computer memory 302 through the USB mass storage controller 102.

Apparatus 500 may also include a male USB interface 204 to an external device, such as a computer. The male USB interface 204 can be operably coupled to the flash computer memory 302 through the USB mass storage controller 102.

The female USB interface 202 and the male USB interface 204 to external devices may provide a way to couple multiple USB drives to a computer (not shown in FIG. 5). In one example, apparatus 500 may be coupled to the computer through the male USB interface 204 and apparatus 500 may be coupled to another storage device (not shown in FIG. 5) through the female USB interface 202. Operably coupling the flash computer memory 302 to the computer through male USB interface 204 and operably coupling the other storage device through the female USB interface 202 can provide access by the computer to the flash computer memory 302, and perhaps most significantly, in some embodiments may provide access by the computer to the other storage device. Thus, apparatus 500 may solve the need in the art to increase the storage capacity that is available to a personal computer.

FIG. 5 shows one female USB interface 202. Other embodiments of apparatus 500 are not so limited, and in fact can include a large number of female USB interfaces that are not shown in FIG. 5, as one skilled in the art will appreciate.

Figure 6:
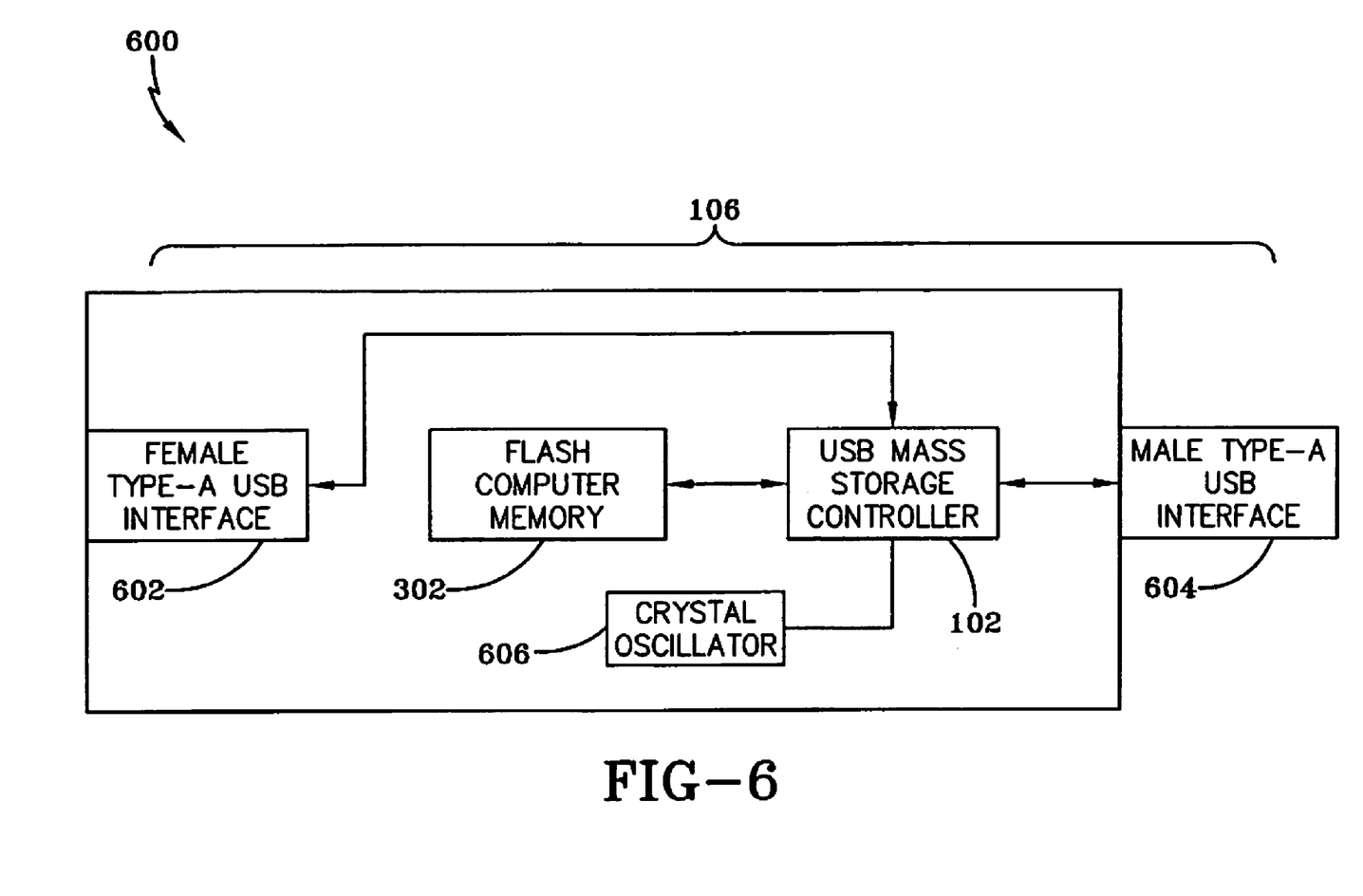
FIG. 6 is a block diagram of a USB flash drive to store data having flash computer memory, a male type-A USB interface, a female type-A USB interface, a crystal oscillator and a housing, according to an embodiment.

FIG. 6 is a block diagram of an USB flash drive 600 to store data having flash computer memory, a male type-A USB interface, a female type-A USB interface, a crystal oscillator and a housing, according to an embodiment. Apparatus 600 may solve the need in the art to art to increase the storage capacity that is available to a personal computer on a USB drive.

Apparatus 600 may include a USB mass storage controller 102 and a flash computer memory 302. The flash computer memory 302 may be one embodiment of the non-volatile computer memory 102 in FIG. 1, although those skilled in the art will know that other non-volatile computer memories may fall within the scope of this invention. In apparatus 600, the plurality of USB interfaces 106 may include a female type-A interface 602 to an external device. The female type-A interface 602 can be operably coupled to the flash computer memory 302 through the USB mass storage controller 102.

Apparatus 600 can also include a male type-A interface 604 to an external device, such as a computer. The male type-A interface 604 can be operably coupled to the flash computer memory 302 through the USB mass storage controller 102.

The female type-A interface 602 and the male type-A interface 604 may provide a way to couple multiple USB drives to a computer (not shown in FIG. 6). In one example, apparatus 600 may be coupled to the computer through the male type-A interface 604 and apparatus 600 may be coupled to another storage device (not shown in FIG. 6) through the female type-A interface 602. Operably coupling the flash computer memory 302 to the computer through male type-A interface 604 and operably coupling the other storage device through the female type-A interface 602 can provide access by the computer to the flash computer memory 302, and, in some embodiments, may provide access by the computer to the other storage device. Thus, apparatus 600 may solve the need in the art to increase the storage capacity that is available to a personal computer.

Apparatus 600 may also include a crystal oscillator 606 that can be operably coupled to the USB mass storage controller 102. Apparatus 600 can also include a housing 608 that encapsulates the USB mass storage controller 102, the flash computer memory 302, the female type-A interface 602, the male type-A interface 604 and the crystal oscillator 606, and upon or in which, the male type-A interface 604 can be mounted.

In some embodiments, the female type-A interface 602 can have at least one female type-A USB interface. In some embodiments, the female type-A interface 602 may be one female type-A USB interface. In some embodiments, the male type-A interface 604 may be at least one male type-A USB interface. In some embodiments, the male type-A interface 604 may be one female type-A USB interface. In some embodiments, the plurality of USB interfaces 106 comprises essentially a single female type-A USB interface and a single male type-A USB interface.

FIG. 6 shows one female type-A USB interface 602. Other embodiments of apparatus 600 are not so limited, and in fact can include a large number of female type-A USB interfaces 602 that are not shown in FIG. 6, as will be appreciated by those skilled in the art.

Figure 7:
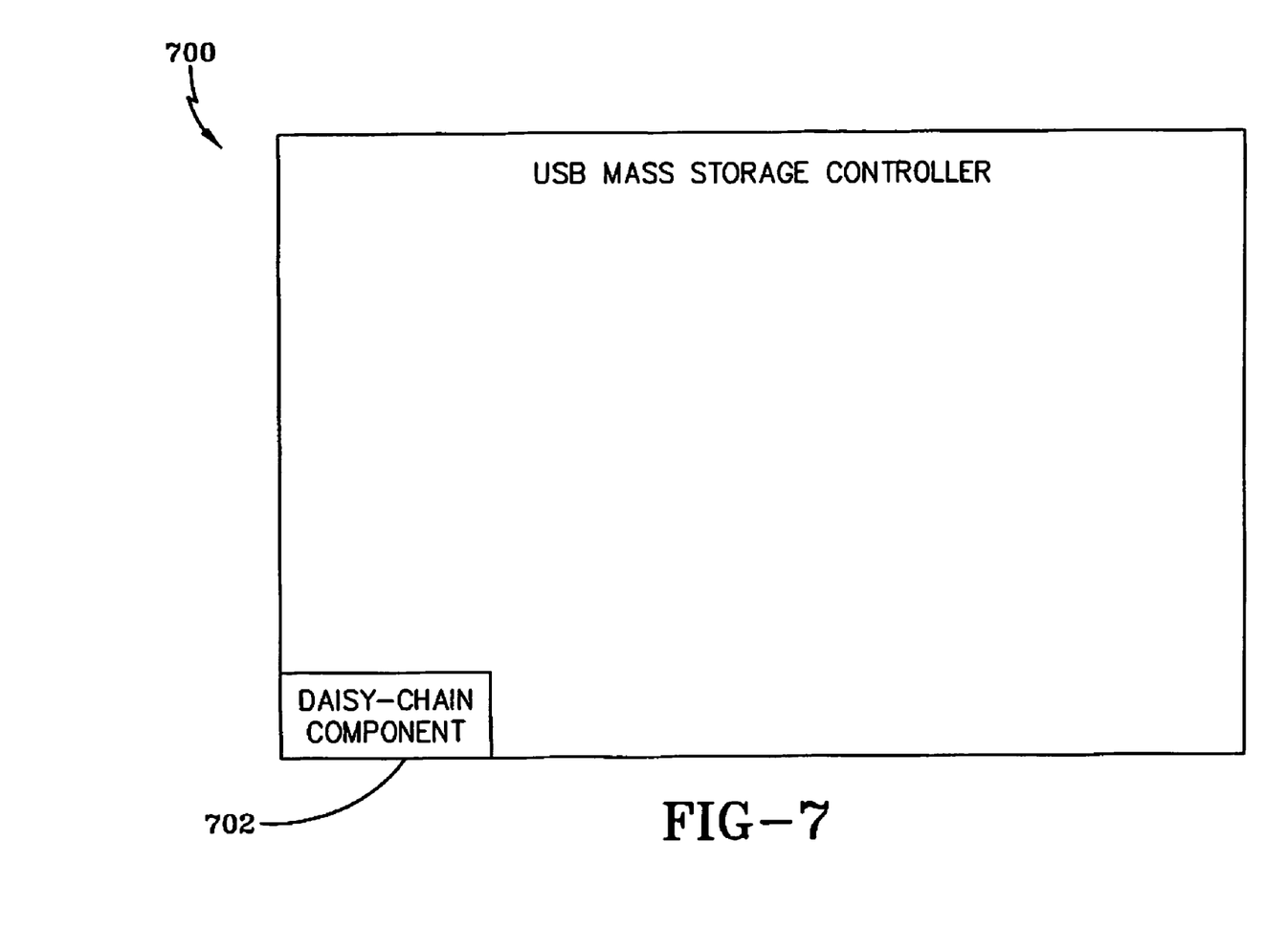
FIG. 7 is a block diagram of a USB mass storage controller having a daisy-chain component, according to an embodiment.

FIG. 7 is a block diagram of a USB mass storage controller 700 having a daisy-chain component, according to an embodiment. Apparatus 700 may solve the need in the art to increase the storage capacity that is available to a personal computer on a USB drive and reduce the complexity of locating data on multiple USB flash drives connected to a computer.

The USB mass storage controller 700 may include a daisy-chain component 702. The daisy-chain component can provide a way to daisy-chain USB storage devices, such as system 100, apparatus 200, apparatus 300, apparatus 400, apparatus 500 or apparatus 600. A daisy-chain may be defined as a configuration in which devices are connected one to another in a series. Data and power is typically transferred from one device to another.

Daisy-chaining may provide same drive identification for each of multiple USB flash drives when connected to a computer. In some embodiments, all of the devices connected in a daisy-chain can be identified and accessible using the same drive letter designation. Thus, all of the devices in the daisy-chain can appear to be one device. The location of data stored on one of the devices may not be distinguishable from the location of data stored on another one of the daisy-chained devices.

Such a device can provide greater storage capacity and can make all files on multiple drives appear as a single logical drive to the user. In addition, larger files/applications can be split over several drives and still accessed as if the files fit on a single drive.

In some embodiments, apparatus components of the USB mass storage controller 102, USB mass storage controller 700, and the daisy-chain component 702 can be embodied as computer hardware circuitry or as a computer-readable program, or a combination of both.

Methods of daisy-chaining can be performed by the computer programs, firmware, or hardware, and may also be composed of computer-executable instructions.

More specifically, in some computer-readable program embodiments, the programs can be structured in an object-orientation using an object-oriented language such as Java, Smalltalk or C++, and the programs can be structured in a procedural-orientation using a procedural language such as COBOL or C. The software components communicate in any of a number of ways that are well-known to those skilled in the art, such as application program interfaces (API) or inter-process communication techniques such as remote procedure call (RPC), common object request broker architecture (CORBA), Component Object Model (COM), Distributed Component Object Model (DCOM), Distributed System Object Model (DSOM) and Remote Method Invocation (RMI).

Figure 8:
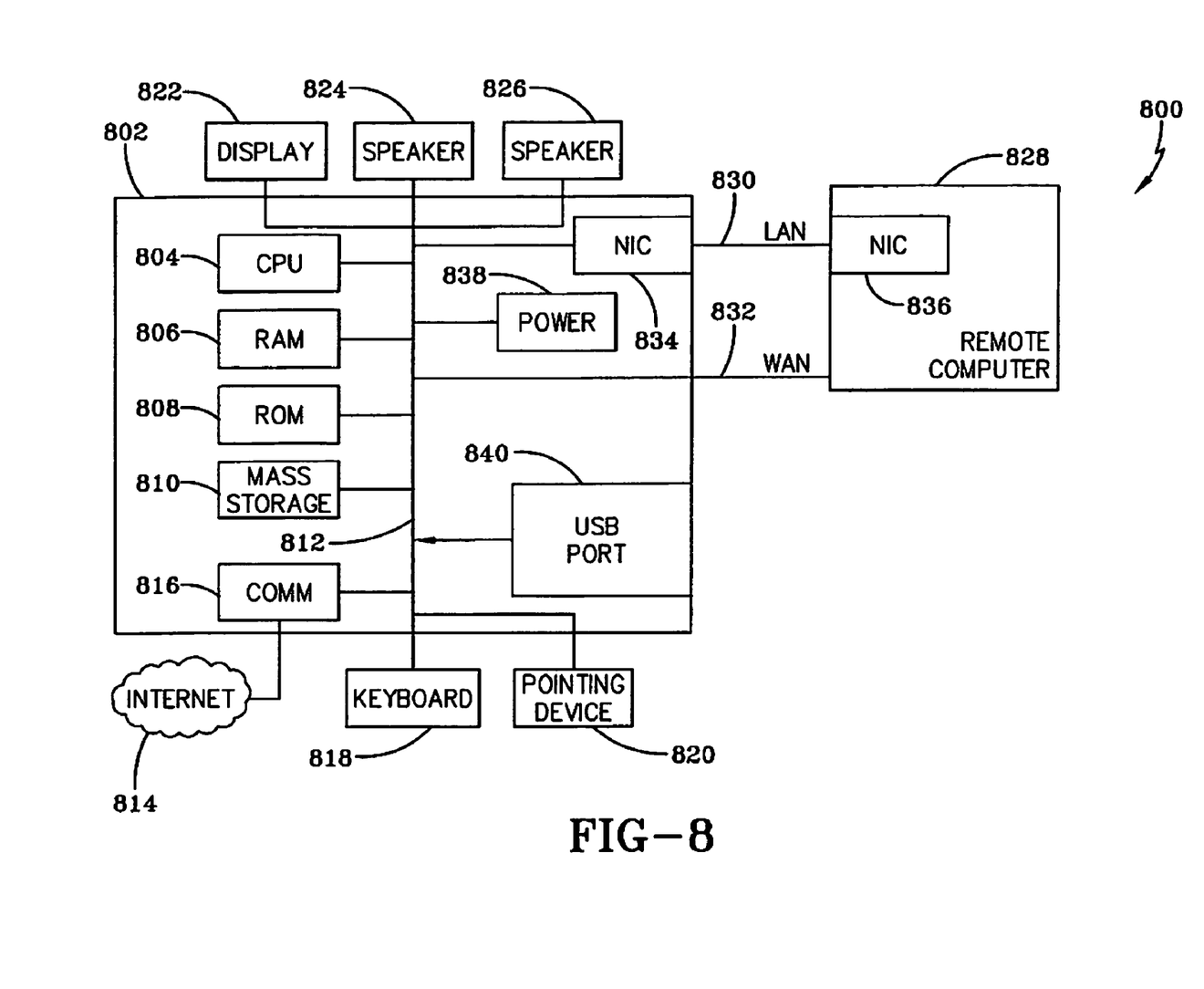
FIG. 8 is a block diagram of a hardware and operating environment in which different embodiments can be practiced.

FIG. 8 is a block diagram of a hardware and operating environment 800 in which different embodiments can be practiced. The description of FIG. 8 can provide an overview of computer hardware and a suitable computing environment in conjunction with which some embodiments can be implemented. Embodiments are described in terms of a computer executing computer-executable instructions. However, some embodiments can be implemented entirely in computer hardware in which the computer-executable instructions are implemented in read-only memory. Some embodiments can also be implemented in client/server computing environments where remote devices that perform tasks are linked through a communications network. Program modules can be located in both local and remote memory storage devices in a distributed computing environment.

Computer 802 may include a processor 804, commercially available from Intel, Motorola, Cyrix and others. Computer 802 can also include random-access memory (RAM) 806, read-only memory (ROM) 808, and one or more mass storage devices 810, and a system bus 812, that operatively couples various system components to the processing unit 804. The memory 806, 808, and mass storage devices, 810, may be types of computer-accessible media. Mass storage devices 810 may be more specifically types of nonvolatile computer-accessible media and can include one or more hard disk drives, floppy disk drives, optical disk drives, and tape cartridge drives. The processor 804 can execute computer programs stored on the computer-accessible media.

Computer 802 can be communicatively connected to the Internet 814 via a communication device 816. Internet 814 connectivity is well known within the art. In one embodiment, a communication device 816 may be a modem that responds to communication drivers to connect to the Internet via what is known in the art as a "dial-up connection." In another embodiment, a communication device 816 can be an Ethernet® or similar hardware network card connected to a local-area network (LAN) that itself can be connected to the Internet via what is known in the art as a "direct connection" (e.g., T1 line, etc.).

A user can enter commands and information into the computer 802 through input devices such as a keyboard 818 or a pointing device 820. The keyboard 818 permit can entry of textual information into computer 802, as known within the art, and embodiments are not limited to any particular type of keyboard. Pointing device 820 may permit the control of the screen pointer provided by a graphical user interface (GUI) of operating systems such as versions of Microsoft Windows®. Embodiments are not limited to any particular pointing device 820. Such pointing devices may include mice, touch pads, trackballs, remote controls and point sticks. Other input devices (not shown) can include a microphone, joystick, game pad, satellite dish, scanner, or the like.

In some embodiments, computer 802 may be operatively coupled to a display device 822. Display device 822 can be connected to the system bus 812. Display device 822 can permit the display of information, including computer, video and other information, for viewing by a user of the computer. Embodiments are not limited to any particular display device 822. Such display devices may include cathode ray tube (CRT) displays (monitors), as well as flat panel displays such as liquid crystal displays (LCD's). In addition to a monitor, computers may typically include other peripheral input/output devices such as printers (not shown). Speakers 824 and 826 can provide audio output of signals. Speakers 824 and 826 can also be connected to the system bus 812.

Computer 802 may also include an operating system (not shown) that can be stored on the computer-accessible media RAM 806, ROM 808, and mass storage device 810, and can be executed by the processor 804. Examples of operating systems may include Microsoft Windows®, Apple MacOS®, Linux®, UNIX®. Examples are not limited to any particular operating system, however, and the construction and use of such operating systems are well known within the art.

Embodiments of computer 802 are not limited to any type of computer 802. In varying embodiments, computer 802 may comprise a PC-compatible computer, a MacOS®-compatible computer, a Linux®-compatible computer, or a UNIX®-compatible computer. The construction and operation of such computers are well known within the art.

Computer 802 can be operated using at least one operating system to provide a graphical user interface (GUI), including a user-controllable pointer. Computer 802 can have at least one web browser application program executing within at least one operating system, to permit users of computer 802 to access an intranet, extranet or Internet world-wide-web pages as addressed by Universal Resource Locator (URL) addresses. Examples of browser application programs can include Netscape Navigator and Microsoft Internet Explorer®.

The computer 802 can operate in a networked environment using logical connections to one or more remote computers, such as remote computer 828. These logical connections may be achieved by a communication device coupled to, or a part of, the computer 802. Embodiments are not limited to a particular type of communications device. The remote computer 828 can be another computer, a server, a router, a network PC, a client, a peer device or other common network node, for example. The logical connections depicted in FIG. 8 can include a local-area network (LAN) 830 and a wide-area network (WAN) 832. Such networking environments are commonplace in offices, enterprise-wide computer networks, intranets, extranets and the Internet.

When used in a LAN-networking environment, the computer 802 and remote computer 828 can be connected to the local network 830 through network interfaces or adapters 834, which can be one type of communications device 816. Remote computer 828 may also include a network device 836. When used in a conventional WAN-networking environment, the computer 802 and remote computer 828 can communicate with a WAN 832 through modems (not shown). The modem, which can be internal or external, may be connected to the system bus 812. In a networked environment, program modules depicted relative to the computer 802, or portions thereof, can be stored in the remote computer 828.

Computer 802 can also include power supply 838. Each power supply can be a battery. Computer 802 can also include at least one USB port 840 having a female interface, such as female USB interface 202 or female type-A interface 602.

Figure 9:
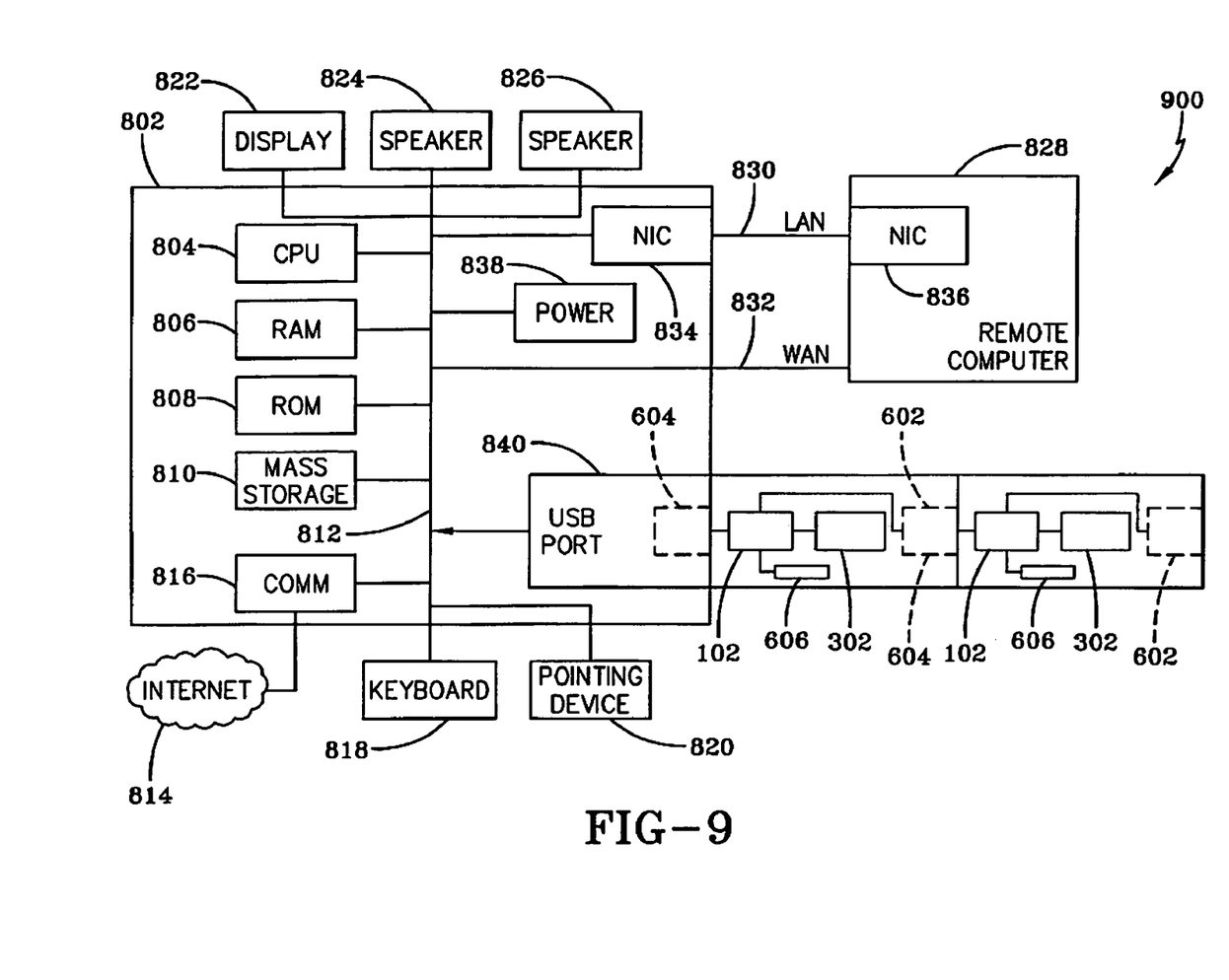
FIG. 9 is a block diagram of the hardware and operating environment in which apparatus can be practiced, according to an embodiment.

FIG. 9 is a block diagram of a hardware and operating environment 900 in which apparatus 600 can be practiced. More specifically, hardware and operating environment 900 can include two (as depicted) or more apparatus 600 engaged in a daisy-chain configuration to USB port 840. As one skilled in the art will recognize, other embodiments of hardware and operating environment 900 exist that fall within the scope of this invention, and in fact can include a large number of apparatus 600 engaged in a daisy-chain configuration to USB port 840.

Figure 10:
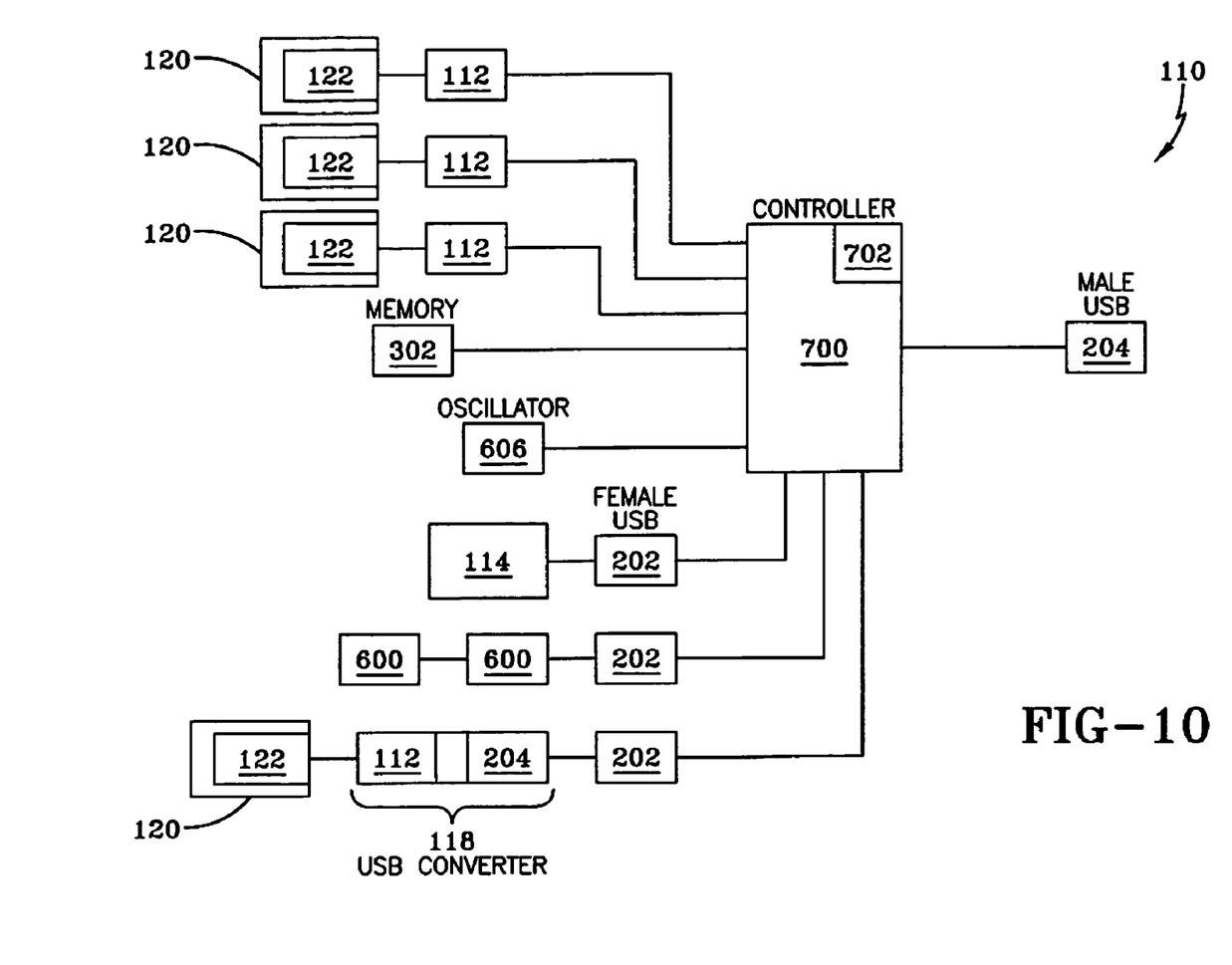
FIG. 10 is a block diagram of a memory apparatus in accordance with an embodiment.

FIG. 10 is a schematic diagram of another embodiment of a memory apparatus 110 in accordance with the invention. Memory apparatus 110 includes a non-volatile computer memory 302 and a USB mass storage controller 700 connected to the non-volatile computer memory 302. The non-volatile computer memory 302 can be, for example, a flash memory, such as a NAND flash memory. The USB mass storage controller 700 includes a daisy chain component 702. An oscillator 606 can be connected to the USB mass storage controller 700. A male USB interface 204 is connected to the USB mass storage controller 700. At least one other interface 112 for a memory device, other than a USB interface, is connected to the USB mass storage controller 700. There can be a plurality of the other interfaces 112, other than USB interfaces, connected to the USB mass storage controller 700.

The at least one other interface 112 is an interface for any type of digital storage medium 120 having a non-volatile memory 122 and no USB interface. Examples of digital storage media 120, include, but are not limited to, Memory Stick, Memory Stick Select, Memory Stick ROM, Memory Stick MagicGate, Memory Stick Duo, Memory Stick Pro, Memory Stick Duo MagicGate, Memory Stick PRO Duo, Memory Stick M2, CompactFlash Type I/II/Ultra II, Microdrive, MagicGate, SmartMedia, SmartMedia ROM, xD-Picture Card, xD-Picture Card M-Type, Secure Digital, mini Secure Digital, micro Secure Digital, Secure Digital Ultra II, Secure Digital High Capacity, MultiMediaCard I, MultiMediaCard II, MultiMediaCard 4.0, MultiMediaCard Dual Voltage, RS-MultiMediaCard, RS-MultiMediaCard 4.0, RS-MultiMediaCard Dual Voltage, and TransFlash interface. Memory apparatus 110 can include one or more memory devices 120 inserted into corresponding interfaces 112.

Memory apparatus 110 can also include at least one female USB interface 202 connected to the USB mass storage controller 700. The at least one female USB interface 202 can include a plurality of female USB interfaces 202. Memory apparatus 110 can include one or more conventional flash drives 114 inserted into female USB interfaces 202. Memory apparatus 110 can include one or more apparatus 600 (FIG. 6) inserted into female USB interfaces 202 of apparatus 110. Multiple apparatus 600 can be linked serially to each other.

Memory apparatus 110 can further include one or more USB converters 118 having a male USB interface 204 and a second interface 112 that is other than a USB interface. The male USB interface 204 of the USB converter 118 can be inserted into the female USB interface 202 of the apparatus 110. The second interface 112 of the USB converter 118 can receive a memory device 120.

Memory apparatus 110 can be used by inserting male USB interface 204 into the USB port of a computer, thereby providing the computer with access to the non-volatile memory 302. In addition, memory devices 120 can be inserted into interfaces 112. By virtue of the daisy chain component 702 in the USB mass storage controller 700, the memories 122 of the memory devices 120 and the memory 302 of the apparatus 110 can appear to the computer as a single combined memory.

Also, the male USB interface 204 of a USB converter 118 can be inserted into the female USB interface 202 of the apparatus 110, and a memory device 120 can be inserted into second interface 112 of the USB converter 118. A plurality of USB converters 118 with memory devices 120 can be inserted into respective female USB interfaces 202 of the apparatus 110. The memories 122 of the memory devices 120 and the memory 302 of the apparatus 110 can appear to the computer as a single combined memory. In addition, conventional USB flash drives 114 and/or inventive memory apparatus 600 can be inserted into the female interfaces 202. The combined memories of the components of memory apparatus 110 can appear to the computer as a single memory.

Figure 11:
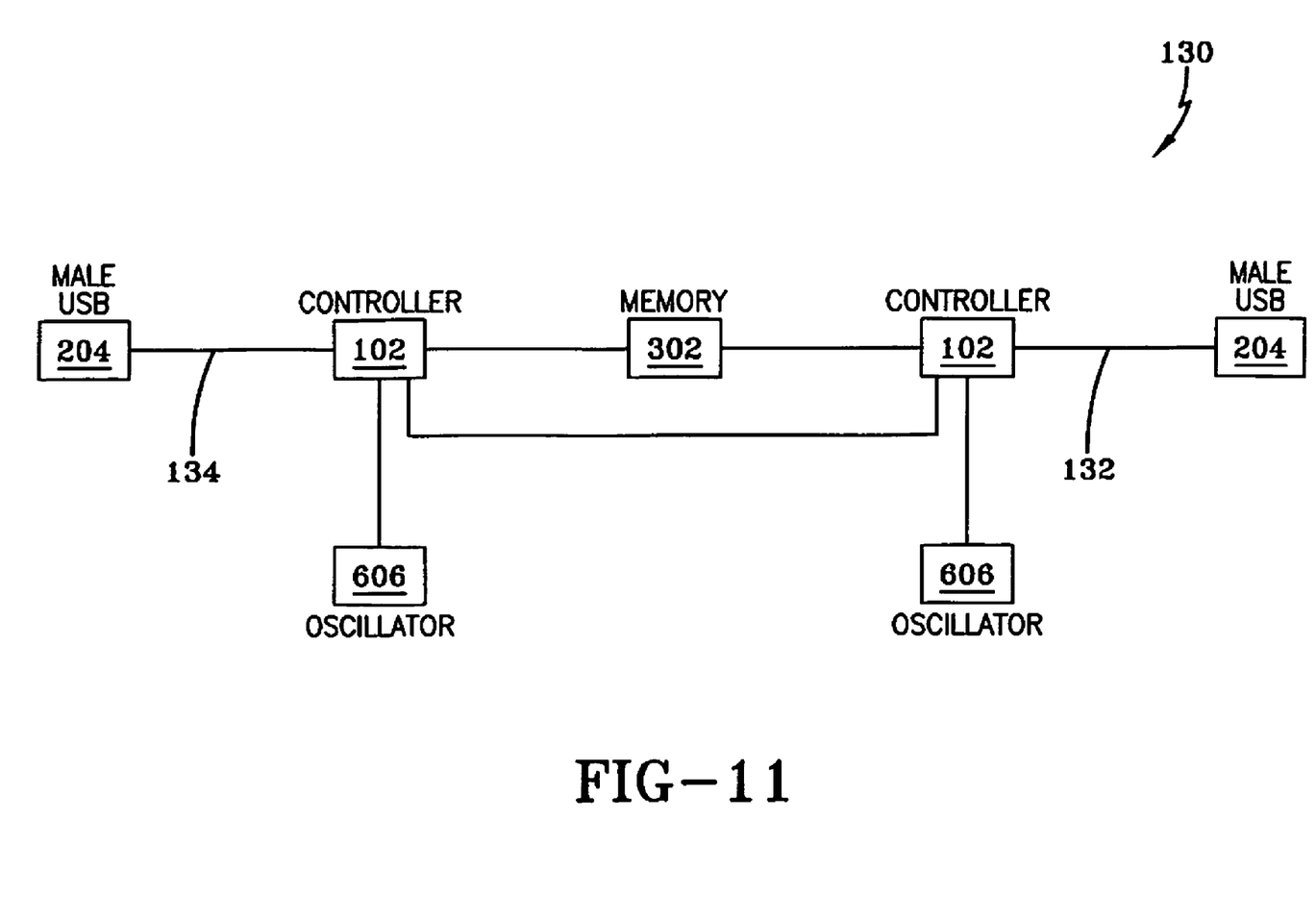
FIG. 11 is a block diagram of a memory apparatus in accordance with a second embodiment.

Often, the contents of a flash drive need to be accessed by multiple computers. FIG. 11 is a schematic diagram of another embodiment of a memory apparatus 130 in accordance with the invention. Memory apparatus 130 includes a non-volatile computer memory 302 and first and second USB mass storage controllers 102, 102 connected to the non-volatile computer memory 302 and to each other. The non-volatile computer memory 302 can be, for example, a flash memory, such as a NAND flash memory. The USB mass storage controllers 102, 102 need not include a daisy chain component 702. Oscillators 606, 606 can be connected to the respective USB mass storage controllers 102, 102. First and second male USB interfaces 204, 204 can be connected to respective USB mass storage controllers 102, 102 via connections 132, 134.

To span the physical distance between the female USB ports of individual computers, one or both of the connections 132, 134 can include an elongated cable. The elongated cable can be any type of cable that will carry the signals between the male USB interfaces 204, 204 and their respective USB mass storage controllers 102, 102. Additional male USB interfaces 204 can be added to the memory apparatus 130. Each male USB interface 204 requires a connection to a separate USB mass storage controller 102. Each USB mass storage controller 102 can be connected to its own oscillator 606 and to the common non-volatile memory 302. In addition, each USB mass storage controller 102 can be connected to the two adjacent USB mass storage controllers 102, in a ring-like configuration.

The memory apparatus 130 can be used by connecting the male USB interfaces 204 into the female USB interfaces of two or more computers. Each connected computer can then access the non-volatile computer memory 302 of the memory apparatus 130.

Figure 12:
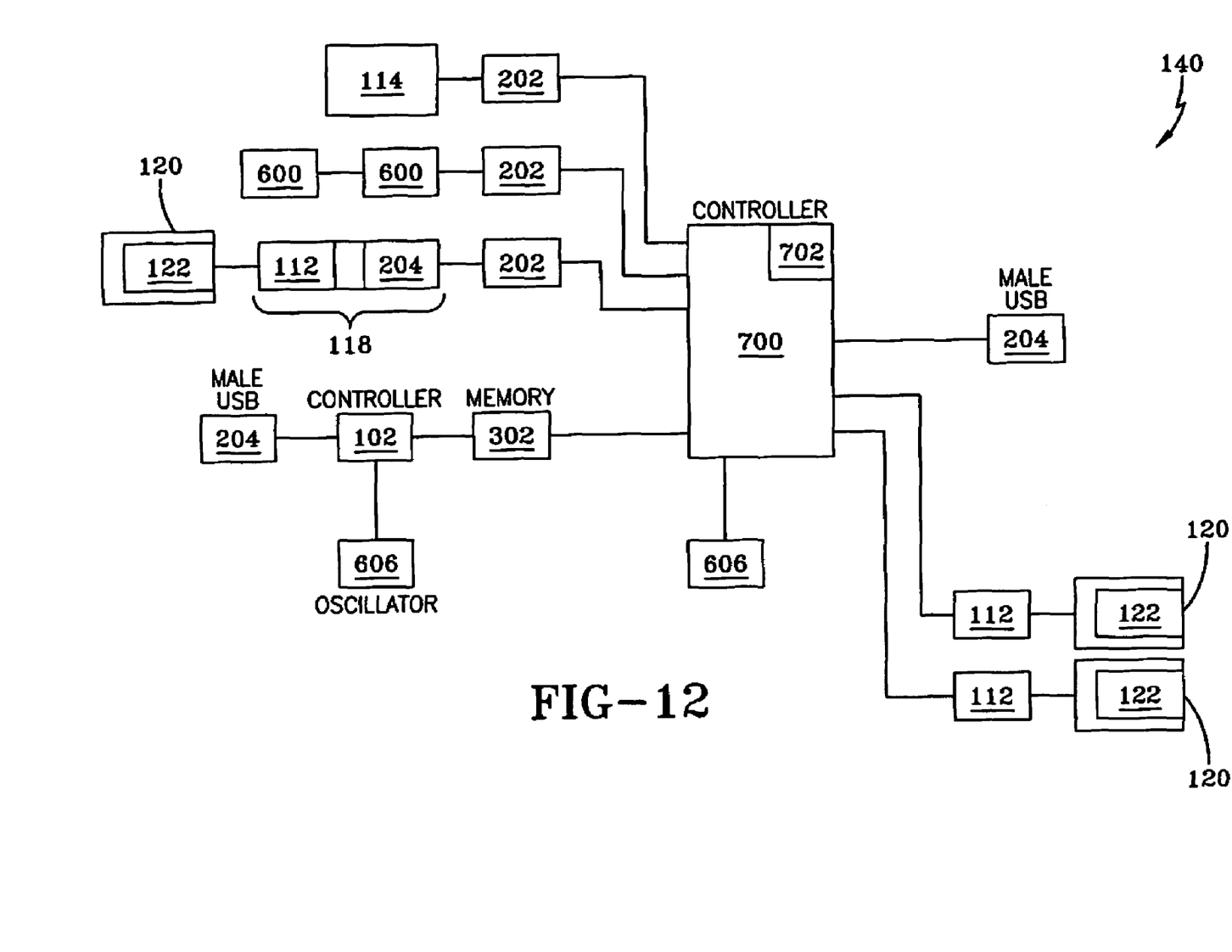
FIG. 12 is a block diagram of a memory apparatus in accordance with a third embodiment.

FIG. 12 is a schematic diagram of another embodiment of a memory apparatus 140 in accordance with the invention. Memory apparatus 140 is similar to apparatus 130, but one of the USB mass storage controllers 102 has been replaced with a USB mass storage controller 700 having a daisy chain component 702. Apparatus 140 can include one or more female USB interfaces 202 and one or more non-USB type interfaces 112.

Memory devices 120 having memories 122 can be connected to non-USB interfaces 112. Conventional USB drives 114, inventive memory apparatus 600, and/or USB converters 118 can be connected to female USB interfaces 202. Multiple computers can be connected to male USB interfaces 204 and thereby view the combined memories of all the components of memory apparatus 140 as a single computer memory. Although two male USB interfaces 204 are shown in FIG. 12, more than two computers can be connected by adding additional male USB interfaces 204, as described with reference to FIG. 11.

Although the above description may contain specific details, they should not be construed as limiting the claims in any way. Other configurations of the described embodiments of the invention are part of the scope of this invention. Accordingly, the appended claims and their legal equivalents should only define the invention, rather than any specific examples given.

What is claimed is:

1. A method of sharing memory apparatus, comprising:
   providing at least a first and a second computer, each having at least one USB port;
   providing a memory apparatus having a computer memory, a first USB mass storage controller connected to the computer memory of the memory apparatus, a first male USB interface connected to the first USB mass storage controller, a second USB mass storage controller connected to the computer memory of the memory apparatus and the first USB mass storage controller, and a second male USB interface connected to the second USB mass controller;
   inserting the first male USB interface of the memory apparatus into the USB port of at least a first one of the computers;
   inserting the second male USB interface of the memory apparatus into the USB port of at least a second one of the computers; and
   accessing a computer memory of the at least first one of the computers through the memory apparatus using the at least second one of the computers bypassing the computer memory of the memory apparatus.

2. The method of claim 1, further comprising:
   accessing the computer memory of the memory apparatus using the at least first one of the computers.

3. The method of claim 1, further comprising:
   accessing the computer memory of the memory apparatus using the at least second one of the computers.

4. The method of claim 1, wherein the first USB mass storage controller includes a daisy chain component and the memory apparatus further comprises at least one additional memory device having a memory, the method further comprising:
   accessing the computer memory of the memory apparatus and the computer memory of the at least one additional memory device as a single combined memory using the at least first one of the computers.

5. The method of claim 1, wherein the first USB mass storage controller includes a daisy chain component and the memory apparatus further comprises at least one additional memory device having a memory, the method further comprising:
   accessing the computer memory of the memory apparatus and the computer memory of the at least one additional memory device as a single computer memory using the at least second one of the computers.

6. A method of sharing memory apparatus, comprising:
   providing at least a first and a second computer, each having at least one USB port;
   providing a memory apparatus having a computer memory, a first USB mass storage controller connected to the computer memory of the memory apparatus, a first male USB interface connected to the first USB mass storage controller, a second USB mass storage controller connected to the computer memory of the memory apparatus and the first USB mass storage controller, and a second male USB interface connected to the second USB mass controller;
   inserting the first male USB interface of the memory apparatus into the USB port of at least a first one of the computers;
   inserting the second male USB interface of the memory apparatus into the USB port of at least a second one of the computers; and
   accessing a computer memory of the at least first one of the computers through the memory apparatus using the at least second one of the computers bypassing the computer memory of the memory apparatus.

7. The method of claim 6, further comprising:
   accessing the computer memory of the memory apparatus using the at least first one of the computers.

8. The method of claim 6, further comprising:
   accessing the computer memory of the memory apparatus using the at least second one of the computers.

9. The method of claim 6, wherein the first USB mass storage controller includes a daisy chain component and the memory apparatus further comprises at least one additional memory device having a memory, the method further comprising:
   accessing the computer memory of the memory apparatus and the computer memory of the at least one additional memory device as a single combined memory using the at least first one of the computers.

10. The method of claim 6, wherein the first USB mass storage controller includes a daisy chain component and the memory apparatus further comprises at least one additional memory device having a memory, the method further comprising:
    accessing the computer memory of the memory apparatus and the computer memory of the at least one additional memory device as a single computer memory using the at least second one of the computers.

* * * * *